Patented Feb. 9, 1954

2,668,847

UNITED STATES PATENT OFFICE 2,668,847

THIOESTERS AND PROCESS

Lawrence W. Newton, South Charleston, W. Va., assignor, by mesne assignments, to Union Carbide and Carbon Corporation, a corporation of New York No Drawing. Application January 28, 1948, Serial No. 4,952

12 Claims. (Cl. 260—481)

This invention relates to the production of a new class of esters of thiopolycarboxylic acids; and more especially it concerns the production of polyesters of thiotetracarboxylic acids and thiohexacarboxylic acids, many of which have utility as plasticizers for vinyl resins and for other synthetic resinous plastic materials such as cellulose acetate and other cellulose esters of the lower fatty acids. The invention also relates to a new class of thiopolycarboxylic acids which can be formed by the hydrolysis of the corresponding esters.

Esters of the new class are produced, in accordance with the invention, by reacting a diester of an $\alpha,\beta$-unsaturated dicarboxylic acid, and especially those having conjugated double bonds, or a corresponding triester of an $\alpha,\beta$-unsaturated olefinic tricarboxylic acid, with hydrogen sulfide at a temperature within the range between 0° C. and 300° C. When employing a basic condensation catalyst in the process it is preferred to conduct the reaction at temperatures between 0° C. and 100° C. In the case of an uncatalyzed reaction, higher temperatures within the range from around 150° C. to 300° C. preferably are used with pressures above atmospheric. The polyesters of the resultant saturated thiopolycarboxylic acid are recovered from the resultant reaction mixture, preferably by fractional distillation under high vacuum.

The new compounds are saturated aliphatic monothiodipolycarboxylic acids having at least 8 carbon atoms, and containing only carbon, hydrogen, oxygen and sulfur in the molecule, and the tetra- and hexaesters of such acids wherein the hydrogen atom of each carboxyl group is replaced by a radical selected from the class consisting of the alkyl, aralkyl, alkoxyalkyl, aryloxyalkyl, cycloalkyl, halogenated alkyl, alkoxyalkoxyalkyl, aryloxyalkoxyalkyl and alkylene radicals.

The preferred esters of the new class of compounds have structures apparently corresponding to the formula

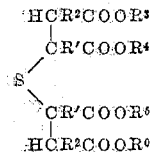

wherein R' may be either hydrogen, a lower alkyl group or a —CH(alkyl)COOR$^3$ group; R$^2$ may be either hydrogen, alkyl, a —CH$_2$COOR$^3$ group or a —CH(alkyl)COOR$^3$ group; R' being hydrogen or alkyl when R$^2$ is either —CH$_2$COOR$^3$, or —CH(alkyl)COOR$^3$, and R$^2$ being hydrogen or alkyl when R' is —CH(alkyl)COOR$^3$; and R$^3$, R$^4$, R$^5$ and R$^6$ are the same or different alkyl, aralkyl, cycloalkyl, alkoxyalkyl, aryloxyalkyl, halogenated alkyl, alkoxyalkoxyalkyl, aryloxyalkoxyalkyl, or alkylene groups.

The reaction with hydrogen sulfide may be conducted in the presence of a solvent for the reactants which is inert to the latter. The use of such a solvent is desirable when the ester of the olefinic polycarboxylic acid is a solid under the reaction conditions, or when such ester is a poor solvent for hydrogen sulfide, or for the catalyst, when employed. Suitable solvents found useful are aliphatic alcohols, such as ethanol and butanol; ethers, such as diethyl ether, the mono- and dialkyl ethers of the glycols and polyglycols, and dioxane; and aromatic hydrocarbons such as benzene.

Although the reaction will proceed slowly in the absence of a catalyst, it is usually desirable to conduct the reaction in the presence of a catalyst in order to cause the reaction to proceed at a commercially practicable rate in simple apparatus at atmospheric pressure. The non-catalytic reaction usually requires the use of high temperatures and superatmospheric pressure in pressure vessels. If desired, pressures above atmospheric may be used in the presence of a catalyst.

Catalysts suitable for use in the process are relatively strongly basic compounds. Those, such as ammonia, sodium hydroxide, etc. which react with the ester of the olefinic polycarboxylic acid to form weak bases are not as effective as the preferred catalysts. The latter include the strong organic bases, such as piperidine, the secondary and tertiary aliphatic amines such as diethylamine and triethylamine; and the quaternary ammonium bases such as trimethylbenzyl ammonium hydroxide. Weak organic bases such as pyridene are less effective as catalysts. Inorganic bases and inorganic-organic bases such as sodium hydride and sodium butylate are effective but are difficultly removable from the reaction products. Ammonia and the primary amines such as butylamine show relatively poor catalyst activity, probably due to reaction thereof with the ester starting material to form weak bases. Neutralized bases such as ammonium carbonate do not function as catalysts.

The reactions involved in the production of the polyesters of certain saturated thiopolycarboxylic acids are represented by the following equations:

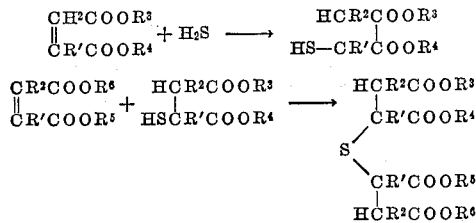

wherein R' to R⁶ designate the radicals previously mentioned.

As shown, the reaction apparently occurs in two stages, the first forming a mercapto derivative of the saturated dicarboxylic acid corresponding to the unsaturated dicarboxylic ester starting material. The second reaction forming the ester of the saturated thiodi(polycarboxylic) acid usually is much faster than the first reaction when catalyzed by the aforesaid catalysts so that the final product consists essentially of the tetra- or hexaester of the thiodipolycarboxylic acid containing only a small amount of the mercapto compounds.

In a preferred practice of the invention successive portions of hydrogen sulfide are diffused through a mixture of the diester of the selected $\alpha,\beta$-unsaturated olefinic polycarboxylic acid and the catalyst while maintaining the reaction temperature between 0° C. and 100° C. When no catalyst is used, temperatures as high as 150° C. or higher conveniently can be used in conjunction with superatmospheric pressures, and the yields of the desired ester are relatively low. The ester and catalyst may be dissolved in an inert volatile solvent when desired. The resultant reaction mixture then is fractionally distilled under vacuum to remove solvent and other volatiles. The fraction containing the desired ester is distilled under high vacuum, usually in a falling film type of molecular still, yielding a purified polyester of a saturated thiodi(polycarboxylic)acid.

Among the polyesters of $\alpha,\beta$-unsaturated olefinic di- and tricarboxylic acids useful in the process may be mentioned the dialkyl, diaralkyl, dialkoxyalkyl, diaryloxyalkyl, dihalogenated alkyl, dialkoxyalkoxyalkyl, diaryloxyalkoxyalkyl, dicycloalkyl and dialkylene esters, such as dimethyl, diethyl, di-isopropyl, dibutyl, di-n-hexyl, di-2-ethylhexyl, di-5-ethylnonanyl-2, dicyclohexyl, dibenzyl, di-methoxyethyl, di-phenoxyethyl, di - methoxyethoxyethyl, di - phenoxyethoxyethyl, di-$\beta$-chloroethyl, di-$\beta$-bromoethyl, divinyl and diallyl esters of such acids as maleic and fumaric acids; methylene malonic and ethylidene malonic acids; alkylmaleic acids, such as methylmaleic (citraconic) acid and ethylmaleic acid; itaconic acid; mesaconic acid; and the corresponding triesters of $\alpha,\beta$-unsaturated olefinic tricarboxylic acids such as aconitic acid, and the $\alpha$- and $\gamma$-alkyl aconitic acids.

In the following examples which illustrate the invention, all parts recited are in terms of weight unless otherwise indicated.

EXAMPLE 1

*Tetramethyl thiodisuccinate*

During 4.5 hours hydrogen sulfide was diffused through a mixture of 1100 parts of dimethyl maleate and 33 parts of triethylamine in a glass reaction tube fitted with a glass diffuser. During this period 112 parts of hydrogen sulfide were absorbed, and the reaction temperature was held at 70° C.–80° C. The liquid reaction products were stripped of volatiles under vacuum and the residue was distilled in a falling film type molecular still. The fraction distilling at 175° C. under a pressure of 0.5 millimeter of mercury was tetramethyl thiodisuccinate in the form of a viscous liquid having a refractive index at 20° C. of 1.4779 and a specific gravity at 30° C. of 1.255. Upon standing several weeks the ester crystallized. Recrystallization thereof yielded a white solid melting at 42° C.

EXAMPLE 2

*Tetrabutyl thiodisuccinate*

During 4 hours 33 parts of hydrogen sulfide were absorbed in a mixture of 417 parts of dibutyl maleate and 5 parts of triethylamine contained in a glass reactor tube provided with a hydrogen sulfide diffuser while maintaining the mixture at temperatures ranging between 43° C. and 57° C. The reaction products were stripped of volatiles in a vacuum still to a kettle temperature of 150° C.–160° C. under 1 millimeter of mercury pressure. The residue was distilled in a molecular type still. The fraction distilling at 156° C. under 0.05 millimeter of mercury pressure was tetrabutyl thiodisuccinate. It had the other properties recited in Table I.

EXAMPLE 3

*Tetrabutyl thiodisuccinate*

A glass reactor provided with a cooling coil was charged with 1200 parts of dibutyl fumarate, 600 parts of butanol and 18 parts of triethylamine, and an excess of hydrogen sulfide over that required to produce tetrabutyl thiodisuccinate was passed through this mixture for six hours. After standing for about 60 hours the reaction mixture was stripped of butanol and other volatiles in a still to a kettle temperature of 186° C. under 2.4 millimeters of mercury pressure. A yield of 1255 parts of crude tetrabutyl thiodisuccinate was secured, corresponding to a yield of around 97% based upon the dibutyl fumarate charged.

EXAMPLE 4

912 parts (4 mols) of dibutyl maleate and 150 parts (4.4 mols) of hydrogen sulfide were charged in a steel pressure vessel. The latter were sealed and the mixture was heated to 150° C. for 15 hours with agitation, under self-induced superatmospheric pressure. The reaction mixture then was fractionally distilled in a Claisen type still to a temperature of 195° C. under a pressure of 3.7 millimeters of mercury. The still residue, crude tetrabutyl thiodisuccinate, was redistilled in a falling film type molecular still, yielding purified tetrabutyl thiodisuccinate.

EXAMPLE 5

*Tetra-n-hexyl thiodisuccinate*

A stream of hydrogen sulfide was diffused during twelve hours through a mixture of 970 parts of di-n-hexyl maleate and 11 parts of triethylamine held at 40° C.–60° C. During the reaction an extra 14 parts of triethylamine were added. The resultant reaction mixture was stripped of volatiles in a Claisen type still to a kettle temperature of 256° C. at 3.6 millimeters of mercury pressure. A yield of 920 parts of crude tetrahexyl thiodisuccinate was secured which, upon redistillation in a molecular type still, boiled at 183° C. under 25 microns of mercury pressure, and had the other properties recited in Table I.

EXAMPLE 6

*Tetra(2-ethylhexyl) thiodisuccinate*

During 5 hours 21 parts of hydrogen sulfide were absorbed in 378 parts of di(2-ethylhexyl)-maleate containing 7 parts of triethylamine, maintained at 39° C.–53° C. The resultant reaction mixture was stripped in a Claisen type still to 200° C. kettle temperature under 2.5 millimeters of mercury pressure, leaving as residue 376 parts of tetra(2-ethylhexyl) thiodisuccinate. Upon distillation of the latter in a falling film type molecular still a purified tetra(2-ethylhexyl) thiodisuccinate was obtained having the properties recited in Table I.

EXAMPLE 7

*Tetra(5-ethylnonanyl-2) thiodisuccinate*

Following the general procedure of Example 6, hydrogen sulfide was diffused during 20 hours within a mixture of 402 parts of di(5-ethylnonanyl-2) maleate and 7 parts of triethylamine held at about 100° C. The reaction mixture was stripped of volatiles in a Claisen type still to a kettle temperature of 223° C. under a pressure of 2 millimeters of mercury, and the still residue was fractionally distilled under high vacuum in a falling film type molecular still. The resultant purified tetra(5-ethylnonanyl-2) thiodisuccinate obtained was an oily liquid having the properties recited in Table I.

EXAMPLE 8

*Tetra(β-methoxyethyl) thiodisuccinate*

During 2 hours hydrogen sulfide was diffused through a mixture of 464 parts of di(β-methoxyethyl) maleate and 10.6 parts of triethylamine in a glass reaction tube, 41 parts of the hydrogen sulfide being absorbed. The temperature ranged between 25° C. and 63° C. The reaction mixture was stripped in a pot still to a kettle temperature of 145° C. at one millimeter of mercury pressure, yielding 466 parts of crude tetra-methoxyethyl thiodisuccinate. Upon fractionally distilling the crude material in a molecular still, the purified ester was secured as a viscous partially water-soluble liquid, distilling at 220° C. at 0.2 millimeter of mercury pressure, and having the other properties recited in Table I. The ester crystallized on standing, and the recrystallized material melted at 42° C.

EXAMPLE 9

*Tetra(β-phenoxyethyl) thiodisuccinate*

During 11.5 hours hydrogen sulfide was diffused through a mixture of 362 parts of di(β-phenoxyethyl) maleate, 400 parts of benzene, and 3.8 parts of triethylamine within a glass reaction tube maintained at 50° C.–75° C. The reaction mixture was stripped of volatiles by distillation to a kettle temperature of 150° C. at 5 millimeters of mercury pressure, yielding 377 parts of crude tetra(β-phenoxyethyl) thiodisuccinate in the form of a liquid too viscous at room temperature to pour. The material eventually crystallized to a white solid which, after recrystallization, melted at 65° C.–67° C.

EXAMPLE 10

*Tetra(β-chloroethyl) thiodisuccinate*

During 3 hours hydrogen sulfide was diffused within a mixture of 241 parts of di(β-chloroethyl) maleate dissolved in 440 parts of benzene and containing 4 parts of triethylamine maintained at a temperature ranging between 30° C. and 45° C., 24 parts of hydrogen sulfide being absorbed. The benzene was stripped from the reaction mixture is a still to a kettle temperature of 170° C. at 2 millimeters of mercury pressure, yielding 259 parts of crude tetra(β-chloroethyl) thiodisuccinate. Upon recrystallization of the crude product from methanol the purified ester was secured as a white crystalline solid melting at 84° C.

EXAMPLE 11

*Tetra(2-ethylbutyl) thiodisuccinate*

During 4 hours hydrogen sulfide was diffused through a mixture of 606 parts of di(2-ethylbutyl) maleate and 6 parts of piperidine in a glass reaction tube maintained at 51° C.–66° C., 40 parts of hydrogen sulfide being absorbed. The crude reaction mixture was stripped by distillation to a kettle temperature of 147° C. at a pressure of 0.5 millimeter of mercury; and the residue was distilled in a molecular type still, yielding purified tetra(2-ethylbutyl) thiodisuccinate in the form of a light yellow liquid having the properties recited in Table I.

EXAMPLE 12

*Tetraallyl thiodisuccinate*

Hydrogen sulfide was diffused during one hour through a mixture of 2 mols of diallyl maleate containing 1% of diethylamine catalyst and 0.1% of lead acetate, maintained at between 30° C. and 70° C., slightly more than one mol of hydrogen sulfide being absorbed. The lead acetate served as a polymerization inhibitor. The crude reaction mixture was fractionally distilled in a falling film type molecular still, providing an 82.5% yield of refined tetraallyl thiodisuccinate in the form of an oily straw-colored liquid boiling at 149° C. at 0.4 millimeter of mercury pressure, and having the other properties recited in Table I.

EXAMPLE 13

*Thiodisuccinic acid*

A mixture of 0.5 mol of tetramethyl thiodisuccinate, 200 cc. of water and 4 cc. of concentrated sulfuric acid was refluxed in a stripping still until methanol ceased to distil over. Water was added periodically to maintain a constant level in the still kettle, while aqueous methanol was removed overhead. The hydrolysis required 8 hours. The residual product was recrystallized three times from water to give a 62% yield of white crystalline thiodisuccinic acid having a melting point of 212° C.–213° C., a purity of 99.7% by titration, and a solubility in water of 8.6% at 20° C.

The tetraethyl and higher esters of this acid are increasingly resistant to hydrolysis.

EXAMPLE 14

*Hexaethyl thiodi(tricarballylate)*

Hydrogen sulfide was passed through a glass reaction tube fitted with a glass diffuser and containing 750 parts of triethyl aconitate and 7.5 parts of diethylamine, maintained between 27° C.–59° C. During 4.5 hours operation 60 parts of hydrogen sulfide were reacted. The crude reaction mixture was distilled in a falling film type molecular still, yielding a refined hexaethyl thiodi(tricarballylate) in the form of an oily liquid boiling at 171° C. under 3 microns of mercury pressure, and having the other properties recited in Table I.

This material was compatible with a vinyl chloride-acetate copolymer resin at 33% concentration to give a clear but rather stiff sheet.

Table II illustrates the relative effectiveness

TABLE I

| Compound | Melting Point °C. | Boiling Point, °C. | Refractive Index, $n_D^T$ | Specific Gravity, $d_{20}^T$ |
|---|---|---|---|---|
| Tetramethyl thiodisuccinate | 42 | 175 at 0.5 mm. pressure | 1.4779 at 20° C | 1.2553 at 30° C. |
| Tetraethyl thiodisuccinate | | 222 at 5.5 mm. pressure | 1.4643 at 20° C | 1.1491 at 20° C. |
| Tetrabutyl thiodisuccinate | | 156 at 0.05 mm. pressure | 1.4589 at 30° C | 1.0545 at 20° C. |
| Tetrahexyl thiodisuccinate | | 183 at 25 microns' pres | 1.4596 at 30° C | 1.0083 at 20° C. |
| Tetra(2-ethylhexyl) thiodisuccinate | | 183 at 17 microns' pres | 1.4610 at 30° C | 0.9821 at 20° C. |
| Tetra(5-ethylnonanyl-2) thiodisuccinate | | 207 at 20 microns' pres | 1.4620 at 32° C | 0.955 at 20° C. |
| Tetrachloroethyl thiodisuccinate | 84 | | | |
| Tetra(β-methoxyethyl) thiodisuccinate | 42 | 220 at 0.2 mm. pressure | | |
| Tetra(β-phenoxyethyl) thiodisuccinate | 65-67 | | | |
| Thiodisuccinic acid | 212-213 | | | |
| Tetraisopropyl thiodisuccinate | | 185 at 1.5 mm. pressure | 1.4538 at 20° C | 1.072 at 20° C. |
| Tetra(2-ethylbutyl) thiodisuccinate | | 231 at 0.5 mm. pressure | 1.4654 at 20° C | 1.016 at 20° C. |
| Hexaethyl thioditricarballylate | | 171 at 3 microns' pres | 1.4681 at 20° C | 1.160 at 30° C. |
| Tetra(2, 6-dimethylheptyl-4) thiodisuccinate | | 156 at 2 microns' pres | 1.4527 at 20° C | 0.942 at 20° C. |
| Tetrabutyl thiodi(α-methylsuccinate) | | 225 at 1.5 mm. pressure | 1.4644 at 20° C | 1.046 at 20° C. |
| Tetraallyl thiodisuccinate | | 149 at 0.4 mm. pressure | 1.4908 at 20° C | 1.149 at 20° C. |
| Hexabutyl thiodi(tricarballylate) | | 183 at 5 microns' pres | 1.4645 at 20.5° C | 1.0622 at 20° C. |

In similar manner hydrogen sulfide was diffused through tributyl aconitate containing 1% diethylamine and about 25% of benzene during 3 hours at 32° C.–51° C. The reaction mixture was stripped in a pot still to a temperature of 175° C. at 2 millimeters of mercury pressure and the residue distilled in a molecular type still, yielding hexabutyl thiodi(tricarballylate) as an oily liquid boiling at 183° C. at 5 microns of mercury pressure, and having the other properties recited in Table I. It was compatible with a vinyl chloride-vinyl acetate copolymer resin to give a clear flexible sheet containing 33% of the compound.

EXAMPLE 15

*Tetrabutyl thiodi(α-methylsuccinate)*

During 15.5 hours hydrogen sulfide was passed through a mixture of 600 parts of dibutyl itaconate and 6 parts of triethylamine in a glass reaction tube maintained at 35° C. An additional 6 parts of triethylamine and 6 parts of diethylamine were added during the reaction period; and 21 parts of hydrogen sulfide were absorbed. The crude reaction mixture was stripped of volatiles up to a kettle temperature of 150° C. at one millimeter of mercury pressure; and the residue therefrom was distilled in a falling film type molecular still to provide 171 parts of refined tetrabutyl thiodi(α-methylsuccinate) as a light yellow liquid boiling at 225° C. at 1.5 millimeter of mercury pressure, and having the other properties recited in Table I.

EXAMPLE 16

*Tetrabenzyl thiodisuccinate*

Hydrogen sulfide was diffused through a mixture of 195 parts of dibenzyl maleate, 400 parts of benzene, and 5 parts of diethylamine. During the first 10 minutes the temperature rose from 25° C. to 50° C. and then subsided gradually during the remaining portion of the 1.5 hour reaction time. The reactor and its contents absorbed 29 parts of hydrogen sulfide as judged by gain in weight. The benzene solvent was stripped off in a Claisen type still to a kettle temperature of 205° C. at 2.5 millimeters of mercury, yielding 204 parts of a yellow syrupy liquid which crystallized on standing. A portion of this product was recrystallized from ethanol, yielding the white waxy solid tetrabenzyl thiodisuccinate with a freezing point of 49.2° C.–49.4° C.

of various catalysts of the type herein described in the production of tetrabutyl thiodisuccinate from dibutyl maleate and hydrogen sulfide in accordance with the present invention. In the runs there recorded hydrogen sulfide was diffused through a 1% solution of the catalyst in 500 grams of dibutyl maleate contained in a small unpacked Pyrex column. The activity of each catalyst was determined by observing the rate at which hydrogen sulfide was absorbed, the maximum temperature elevation, the length of time required to complete the reaction, and the yield of the tetra-ester. In certain runs butanol was used as a solvent.

TABLE II

*Preparation of tetrabutyl thiodisuccinate*

EFFECT OF CATALYSTS

| | H₂S Absorbed, Grams | Peak Temperature, °C. | Completion Time, Hrs. | Tetra-Ester Yield, Percent |
|---|---|---|---|---|
| Trimethylbenzyl ammonium hydroxide | 35 | 100 | 1.75 | 96.0 |
| Piperidine | 32 | 82 | 3.0 | 96.6 |
| 2,5-dimethyl piperazine | 35 | 87 | 3.0 | 96.2 |
| Diethylamine | 30 | 98 | 3.0 | 96.0 |
| Triethylamine | 45 | 50 | 3.0 | 98.6 |
| Diisopropylamine | 31 | 70 | 40 | 95.5 |
| Ammonia | 27 | 63 | | 93.4 |
| Sodium hydride | 25 | 51 | 3.4 | 60.6 |
| Sodium butylate | 8 | 31 | 3.0 | 28.8 |

The tetraalkyl esters of thiodisuccinic acid are valuable plasticizers for vinyl resins such as vinyl chlorides, copolymers of vinyl chloride and vinyl acetate, and copolymers of vinyl chloride and vinylidene chloride. Upon milling a mixture of 33 parts of each of the tetraethyl, tetrabutyl and tetrahexyl esters of thiodisuccinic acid with 2 parts of a well-known light stabilizer such as dibutyl tin dilaurate and 65 parts of a vinyl chloride-vinyl acetate copolymer resin containing around 96% of the chloride in the polymer, using a small two-roll mill, clear flexible sheets were obtained which showed no evidence of sweating out of the plasticizer on standing for several months.

Table III lists some properties of certain molded specimens of mixtures of the aforesaid vinyl resin and various tetraalkyl thiodisuccinates of the invention. The compatibility of the resin with the plasticizer was 100% in each case.

TABLE III

Plasticizer evaluation

CHARACTERISTICS OF MOLDED RESIN SPECIMENS

| Name | Plasticizer Content, Percent | $T_F$, °C. | Percent Extraction | | ASTM Stiff. Mod. | Tensile Strength, p. s. i. | Elongation, Percent |
|---|---|---|---|---|---|---|---|
| | | | Oil at 25° C. | Water at 25° C. | | | |
| Tetraethyl thiodisuccinate | 38.0 | −17.4 | 12.0 | 12.9 | 750 | 2,790 | 335 |
| Tetraisopropyl thiodisuccinate | 40.8 | −13.5 | 8.6 | 2.0 | 525 | 2,530 | 330 |
| Tetrabutyl thiodisuccinate | 38.0 | −27.3 | 17.0 | 0.34 | 575 | 2,520 | 332 |
| Tetra(2-ethyl-butyl)thiodisuccinate | 40.5 | −29.5 | 15.6 | 0.5 | 740 | 2,425 | 350 |
| Tetrahexyl thiodisuccinate | 38.8 | −32. | 28.0 | 0.40 | 700 | 2,350 | 330 |

The tetramethyl ester of thiodisuccinic acid is compatible with the vinyl resin, but sweat-out difficulties arise. The tetra(2-ethylhexyl) ester of thiodisuccinic acid is compatible with the resin in 33% plasticizer concentration, but this is near the borderline of compatibility therewith. The tetrabutyl thiodisuccinate appears to be a most valuable plasticizer of this series of compounds for use with the polyvinyl chloride resins and the vinyl chloride-vinyl acetate copolymer resins. This particular compound possesses properties very similar to dioctyl phthalate in most respects affecting its plasticizing efficiency for the resins, while being superior to the latter in evaporation rate, heat stability, and milling life. The hexaethyl and hexabutyl esters of thioditricarballylic acid also are compatible with copolymers of vinyl chloride and vinyl acetate in up to at least 33% of the resinous composition. The lower tetraalkyl and tetraalkoxy alkyl thiosuccinates such as tetramethyl and tetra-(methoxyethyl) thiodisuccinates are compatible with cellulose acetate, and impart to the latter properties generally similar to those imparted thereto by diethyl phthalate, which is a widely used commercial plasticizer for cellulose acetate.

The following illustrates the plasticizing efficiency of tetrabutyl thiodisuccinate for vinyl resins:

A plastic composition containing 67% of a vinyl resin, 1% of lead stearate, 2% of litharge, and 30% of tetrabutyl thiodisuccinate was prepared on a two-roll mill, and was examined to evaluate the last-named compound as plasticizer. The resin was a copolymer of vinyl chloride and vinyl acetate containing 96% of the chloride in the polymer. The composition had a tensile strength of 3400 p. s. i., an ultimate elongation of 250% under a stress of 15,000 p. s. i./minute, and an elongation of 45% under a stress of 1,000 p. s. i. A film 0.004 inch thick made from the composition was unaffected after immersing in water at 25° C. for 10 days; and it lost 4.2% of its weight during immersion in oil at 25° C. for the same period. It lost 0.4% of its weight upon exposure for 10 days in air at 60° C. This plasticizer is non-toxic, and has a plasticizing efficiency equalling that of dioctyl phthalate.

The invention is susceptible of modification within the scope of the appended claims.

I claim:

1. An ester of a thiopolycarboxylic acid having a structure represented by the formula

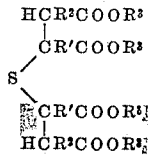

wherein R' is a radical selected from the class consisting of hydrogen, the lower alkyl groups and the —CH$_2$COOR$^3$ groups; R$^2$ is a radical selected from the class consisting of hydrogen, the lower alkyl groups and the —CH$_2$COOR$^3$ groups, but wherein R' and R$^2$ do not concurrently designate a radical having a —COOR$^3$ component; and each R$^3$ is a radical selected from the class consisting of the alkyl, aralkyl, alkoxyalkyl, aryloxyalkyl, halogenated alkyl, cycloalkyl, alkoxyethoxyethyl, aryloxyethoxyethyl and alkenyl radicals.

2. As new compounds, esters of saturated aliphatic symmetrical monothiodipolycarboxylic acids, the total acid radicals of which together have from eight to twelve carbon atoms and contain only carbon, hydrogen and one sulfur atom in addition to the carboxyl carbon and oxygen atoms, said compounds having from four to six alkyl-substituted carboxyl groups respectively attached to different carbon atoms.

3. As new compounds, the tetraalkyl esters of symmetrical monothiodisuccinic acid, each of the alkyl groups containing from one to eleven carbon atoms.

4. As new compounds, the tetraalkoxyethyl esters of symmetrical monothiodisuccinic acid.

5. The tetraalkyl esters of thiodi(alkylsuccinic) acids wherein the said alkyl radical of the alkylsuccinic group has not more than three carbon atoms.

6. Tetrabutyl thiodisuccinate.

7. The hexaalkyl esters of a saturated aliphatic symmetrical monothiohexacarboxylic acid wherein the six esterified carboxyl groups are attached respectively to different carbon atoms.

8. The hexaalkyl esters of thiodi(tricarballylic) acid.

9. Process for producing polyesters of thiopolycarboxylic acids, which comprises reacting hydrogen sulfide at an elevated temperature with a polyester of an α,β-unsaturated olefinic polycarboxylic acid, which polyester contains from two to three esterified carboxyl groups in the molecule, and in the absence of added water, and recovering from the resultant reaction mixture the polyester of a symmetrical monothiodipolycarboxylic acid thus produced.

10. Process for producing polyesters of thiopolycarboxylic acids, which comprises reacting hydrogen sulfide with a polyester of an α,β-unsaturated olefinic polycarboxylic acid, which polyester contains from two to three esterified carboxyl groups in the molecule, in the presence of a basic compound as catalyst and in the absence of added water, and recovering from the resultant reaction mixture the polyester of a symmetrical monothiodipolycarboxylic acid thus produced.

11. Process for producing polyesters of thiopolycarboxylic acids, which comprises reacting and condensing hydrogen sulfide with a polyester of an aliphatic α,β-unsaturated polycarboxylic acid, which polyester contains from two to three esterified carboxyl groups in the molecule, in the presence of an alkaline nitrogen-containing compound selected from the class consisting of the primary, secondary and tertiary amines, ammonia and the quaternary ammonium bases, and in the absence of added water, and recovering from the resultant reaction mixture the polyester of a thiopolycarboxylic acid thus produced.

12. Process for producing polyesters of thiopolycarboxylic acids, which comprises reacting and condensing hydrogen sulfide with a diester of an α,β-unsaturated olefinic dicarboxylic acid which acid has between four and six carbon atoms in the molecule, in the presence of an organic base as catalyst and in the absence of added water, and recovering from the resultant reaction mixture the polyester of a symmetrical monothiodipolycarboxylic acid thus produced.

LAWRENCE W. NEWTON.

References Cited in the file of this patent

UNITED STATES PATENTS

| Number | Name | Date |
|---|---|---|
| 1,652,099 | Douglass | Dec. 6, 1927 |
| 2,121,617 | Werntz | June 21, 1938 |
| 2,176,423 | Jaeger | Oct. 17, 1939 |
| 2,212,141 | Alderman | Aug. 20, 1940 |
| 2,268,185 | Burke et al. | Dec. 30, 1941 |
| 2,356,586 | Hentrich | Aug. 22, 1944 |

FOREIGN PATENTS

| Number | Country | Date |
|---|---|---|
| 845,793 | France | May 22, 1939 |